United States Patent [19]
Falkenbach et al.

[11] 4,422,343
[45] Dec. 27, 1983

[54] KITCHEN APPLIANCE WITH INTERCHANGABLE ATTACHMENTS

[75] Inventors: Günther Falkenbach, Eschborn; Dieter Seuwen, Frankfurt; Jürgen Schneider, Kronberg; Hartwig Kahlcke, Bad Soden, all of Fed. Rep. of Germany

[73] Assignee: Braun Aktiengesellschaft, Kronberg, Fed. Rep. of Germany

[21] Appl. No.: 360,074

[22] Filed: Mar. 19, 1982

[51] Int. Cl.³ .............................................. A47J 43/44
[52] U.S. Cl. ................................... 74/16; 192/67 R; 192/114 R; 241/101.1; 310/50; 366/200
[58] Field of Search .................. 74/16; 192/35, 67 R, 192/114 R; 241/101.1; 310/50, 47; 366/200

[56] References Cited

U.S. PATENT DOCUMENTS

| | | | |
|---|---|---|---|
| 2,917,929 | 12/1959 | Sprague | 74/16 |
| 3,109,949 | 11/1963 | Hartwig et al. | 241/101.1 |
| 3,951,351 | 4/1976 | Ernster et al. | 241/101.1 |
| 4,325,643 | 4/1982 | Scott et al. | 366/200 |

FOREIGN PATENT DOCUMENTS 1083993 4/1957 Fed. Rep. of Germany .
1132689 6/1960 Fed. Rep. of Germany .
2551842 11/1975 Fed. Rep. of Germany .

*Primary Examiner*—J. D. Miller
*Assistant Examiner*—D. L. Rebsch
*Attorney, Agent, or Firm*—Robert A. Shack

[57] ABSTRACT

A kitchen appliance, having an interchangeable tool attachment, such as a stirrer arm, and an interchangeable container attachment, such as a food chopper. The tool attachment has a base which is secured to the appliance through rotation of a rotatable tension ring assembly, surrounding a power takeoff shaft and a retainer ring, and includes a housing pivotally connected to the base. The container attachment is secured through recesses in its base which engage pins on the retainer ring. A locking bolt is provided on the container attachment which engages the cover thereof, the locking bolt being engageable in a locked position by a slide coupled to a power switch through a blocking rod whenever the power switch is actuated, such that the container attachment cover may not be removed with the appliance in an activated state. An inclined surface on the cover periphery displaces the locking bolt to the locked position when the cover is closed, where a locking finger on the cover engages an opening in the locking bolt.

13 Claims, 7 Drawing Figures

KITCHEN APPLIANCE WITH INTERCHANGABLE ATTACHMENTS

BACKGROUND OF THE INVENTION

1. Field of the Invention

The invention concerns a power unit driven by an electric motor, adapted for use in kitchen machines, with a motor base that has at least one power take-off shaft, to which drivable tools, stirrer arms, and attachments such as mixing attachments, choppers, or the like, can be attached.

2. Description of the Prior Art

Kitchen machines are known (for example, DE-PS No. 25 51 842), in which the power unit is pivotally mounted on a stand. Here, the power unit consists of a part which has as a driving motor, a stirrer arm, through which the motor shafts are conducted, and a transmission head with a planetary gear. The transmission head has two different power take-off shafts and can be equipped with various tools, such as a stirring wisk or a kneading fork, or also with working devices such as, for example, a chopper. This known kitchen machine has the disadvantage that, while the device is being used, its high stand tends to vibrate, causing the unit to produce excessive noise.

In another known kitchen machine (DAS No. 1 132 689), the driving motor, together with the power take-off shafts, is housed in a box-shaped flat power base, whereby the power take-off is arranged at the upper side of the power base. The working units themselves are coupled with the power base through an attachment socket that is equipped with interlock means. However, this kitchen machine is not suitable for operating a rotating stirring dish with a kneading and stirring hook moving therein.

Finally, a multi-purpose kitchen machine is known (DAS No. 1 083 993) which has a base extension arm affixed at the base of the device, on which a removable stirring dish is rotatably mounted, and with a transmission arm, which can be set on the device base and which comprises two power take-off shafts, one of which drives the stirring dish from the top and the other of which drives the working tool. However, this multi-purpose kitchen machine has the disadvantage that the transmission arm must be removed from the device base when the stirring dish is needed.

SUMMARY OF THE INVENTION

An object of the present invention has the provision of a power unit for a multi-purpose kitchen machine to which a transmission arm, a stirrer arm or an attachment unit can optionally be coupled. Another object is the provision of a kitchen machine with an attachment in which, when the attachment is coupled in, the motor switch and the motor base are actuable only when the container of the attachment is closed. A still further object is the provision of a kitchen machine having a transmission arm capable of being coupled with the motor base in such a fashion that, in a first interlocking position, it is retained tiltable at the motor base, and only in a second interlocking position (running position) is it rigidly coupled with the motor base.

According to the invention, these objects are achieved by the motor base having a retainer ring which surrounds the power take-off shaft and which is rigidly connected with the motor base. A tension ring surrounds the retainer ring and is provided with an activation arm, which is pivotally mounted and which is secured against moving in the longitudinal direction of the power take-off ring, by means of a flange part and by means of a clamping ring that is connected with said flange part. The flange part has recesses through which penetrate the radially extending protrusions of the base of a tool support or of a stirrer arm, where said base can be inserted into the retainer ring.

The retainer ring is advantageously provided with radially extending pins which act together with the recesses and/or slots, which are provided on the base of the container.

It is therefore possible optionally to attach to the retainer ring the base of an attachment unit, which is equipped with protrusions, which are held by the flange part when the tension ring is pivoted out, or else at the base of another attachment which has slots, which are engaged by pins after the tension ring has been pivoted out, where said pins rigidly arrest the base part. In a preferred embodiment, the base is pivotally connected with the housing of the stirrer arm through a hinge, whose hinge axis is disposed perpendicular to the longitudinal axis of the power take-off shaft. The stirrer arm has one or more fingers which, in the working position of the stirrer arm, extend vertically downward, and which have protrusions that grip down underneath the flange part of the tension ring.

To insure that the tension ring uniformly and reliably transmits to the motor base the tension forces that act on the tension ring's flange part, when the attachment unit or stirrer arm is coupled in, the tension ring, which is pivotably mounted with respect to the motor base, is connected with the clamping ring through grooves, screws, or stud bolts. The tension ring and the clamping ring circularly grip the inner edge of an annular collar of the housing of the motor base.

In an embodiment which permits the reliable coupling of an attachment unit, for example a chopper, with the motor base, the activation arm of the tension ring has an opening through which there penetrates a locking pin, which is movably mounted at the container of the attachment unit and which is movable over the cover so as to arrest the cover in the locked position.

To keep the locking pin from unintended motion in the sense of opening the lock, the locking pin has a head part with a groove, at that end which is turned away from the cover. For locking purposes, this groove enters a slot, which is disposed in a slide next to an entry opening. The slide is movably mounted relative to the activation arm, whereby the slide acts together with a blocking rod, which arrests or releases the electrical switch for switching on the driving motor. In order that the attachment unit can be easily removed from the motor base when the motor is switched off, the slide is acted upon by a spring, which acts on said slide in the sense of unlocking it, whereby a blocking rod is provided, which is movable over the electrical motor switch, and which moves the slide in the locking sense against the spring force.

Preferably, the cover of the device attachment is rotatably mounted and guided about the container axis, after it has been placed on the container. A run-up ramp at the edge of the cover moves the locking pin against the force of a spring in the sense of making an interlock, and a locking finger disposed at the edge of the cover penetrates through an opening in the locking pin, and at the same time its head part penetrates through the opening in the slide and the opening in the activation arm.

To make sure that the cover of the attachment unit, for example a chopper, cannot be opened when the motor is switched on and can be removed from the container of the attachment unit, a preferred embodiment has a locking finger, disposed at the edge of the cover, where said locking finger has a claw, which, after the locking finger has penetrated through the opening in the locking bolt, prevents rotation of the cover about the container axis relative to the container.

Preferably, the flange part of the pivotable tension ring has a concentric opening for the base to penetrate, whereby a recess is provided that extends radially outward from the opening, and through which the protrusion of the base of the stirrer arm penetrates when it is in the starting position of its pivoting range and whereby two other recesses are provided, which extend radially outward from the opening, through which penetrate the protrusions of the stirrer arm. In this design of the flange part of the tension ring, the result that, in the case of a stirrer arm whose base has three protrusions, one of these protrusions prevents an axial motion of the base in the retainer ring, while the other two protrusions prevent a tilting of the stirrer arm with respect to the base, is achieved.

In a preferred embodiment, the base of the device attachment has radially extended slots or recesses which are engaged by the pins of the retainer ring, when the tension ring, together with the device attachment is turned into the locking position.

One advantage of the power unit according to the invention consists of the fact that all the tools, attachments, and also the stirrer arm, can be fastened on the upper side of the motor base. For this reason, the motor base can have a very flat, square-shaped, and thus stable design. The stirrer arm, on the one hand, is coupled very solidly with the motor base while it is in its working position and, on the other hand—after the tension ring has been activated in the sense of opening it—the stirrer arm can be tilted away from the motor base in such a fashion that simultaneously the connection between the power take-off shaft and the drive shaft of the stirrer arm is broken.

Another advantage of the power unit according to the invention consists in the fact that a special electrical braking device for the motor, which would brake the motor after the cover of the attachment unit has been opened, can be dispensed with, since opening the cover is possible only after the motor has been switched off.

Finally, an advantage of the power unit according to the invention consists of the fact that a large number of different tools, attachments, or transmission arms can be provided, all of which can be coupled with the motor base through a single retainer ring. Consequently, no additional protective attachments are necessary to cover the power take-off shafts and/or power unit couplings.

The invention permits of a great number of embodiments. One of these is schematically shown in the enclosed drawings. In particular, the following are shown:

DESCRIPTION OF THE PREFERRED EMBODIMENT

Figure 1:
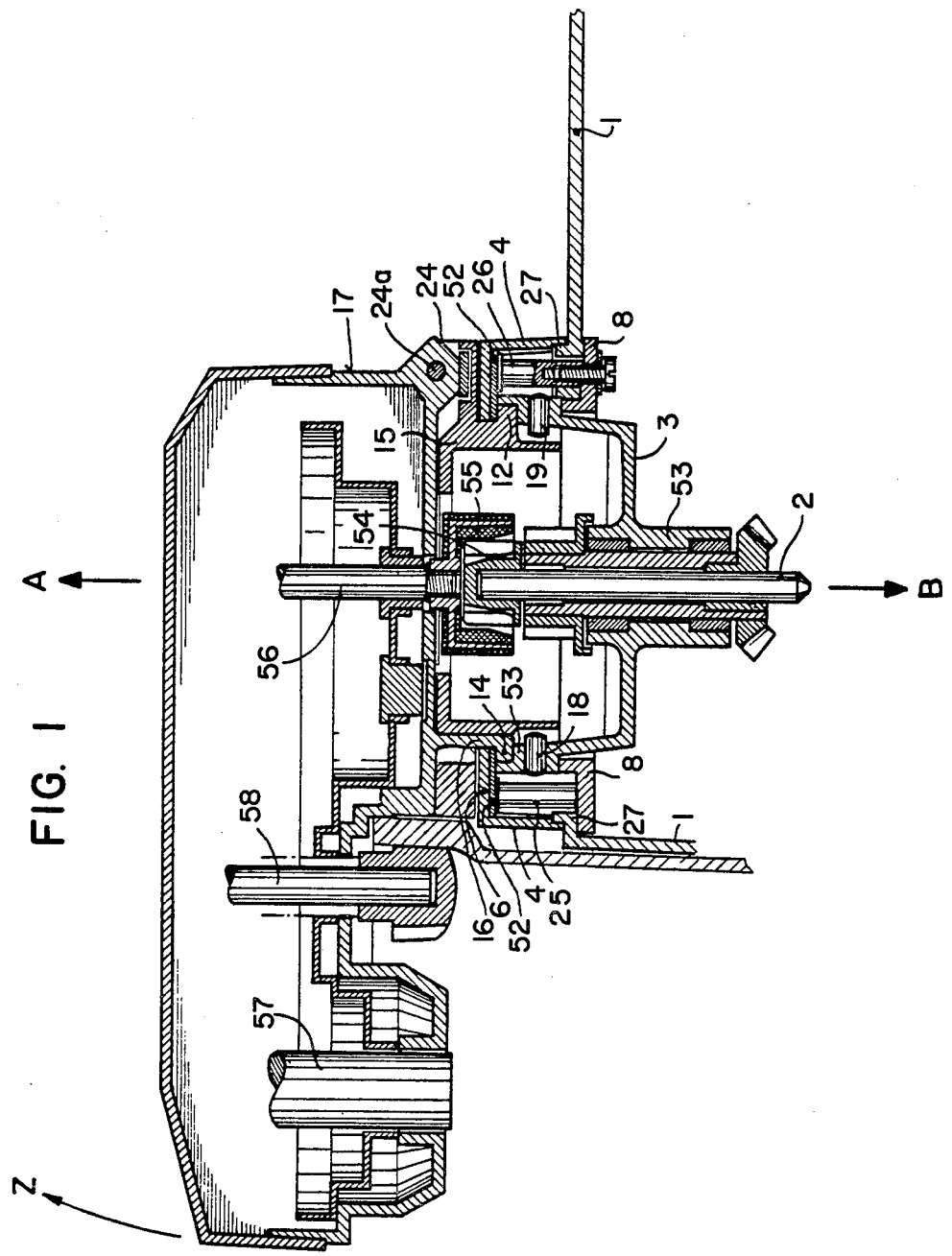
FIG. 1 shows a partial longitudinal section through the stirrer arm, pivoted into its working position, and through a portion of the motor base with the power take-off shaft, and a section through the retaining and tensioning device.

As FIG. 1 shows, a tension ring 4 is rotatably mounted at the housing of the motor base 1 and it surrounds the power take-off shaft 2. The tension ring 4 is held by a clamping ring 8, which in turn is fastened at the flange part 6 of the tension ring 4 through stud bolts 23, 25, 26. The tension ring 4 is prevented from moving laterally by means of a collar 27 of the motor base 1. A retainer ring 3 is held between the flange part 6 or a ring 52 adjoining the flange part 6, on the one hand, and a clamping ring 8 on the other hand. The stud 53 of the retainer ring 3 serves as a bearing for the power take-off shaft 2.

Figure 6:
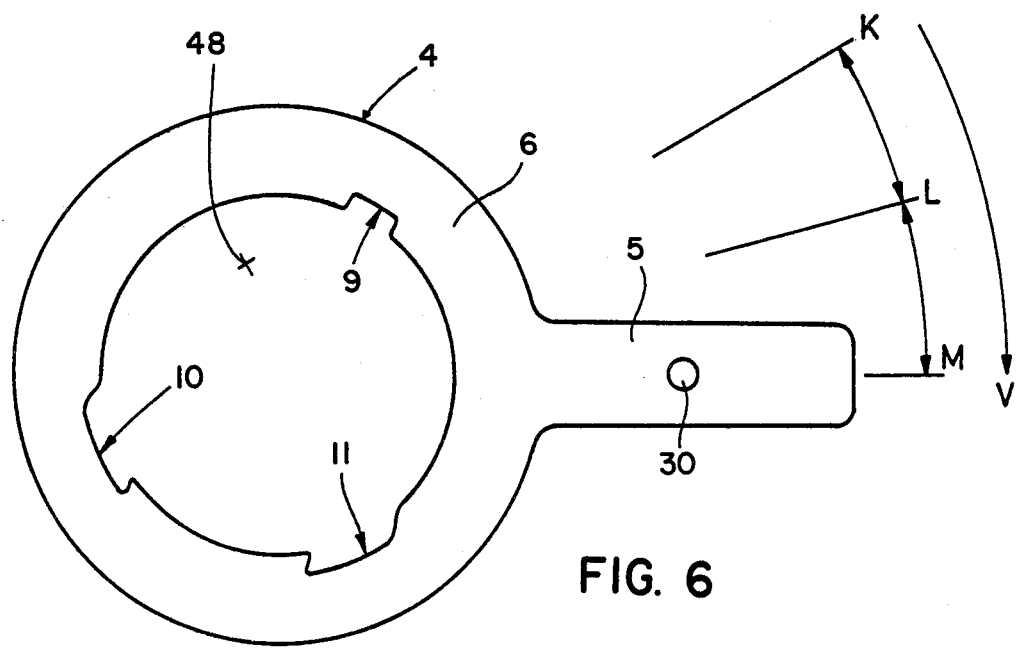
FIG. 6 shows a top view of the flanged part of the tension ring.

The base 15 of the stirrer arm 17 is inserted into the retainer ring 3 from the top, with protrusions 12, 13, 14 projecting through recesses 9, 10, 11 of tension ring 4 (see FIG. 6). The protrusion 12 of the stirrer arm 17 is prevented from moving in the arrow direction A by the flange part 6 or by the ring 52, as soon as the flange part 6 of the tension ring 4 is pivoted from the starting position (position K) into the position L (FIG. 6) (about the axis A-B, FIG. 1).

FIG. 1 shows the stirrer arm 17 pivoted into its working position. Here, the fingers 16, 16a grip underneath the flange part 6 with their protrusions 13, 14. They are pressed by the flange part 6 against the shoulder 53 (inasmuch as the tension ring 4 has been pivoted into the position M with the flange part 6, FIG. 6).

The stirrer arm 17 is connected with the base 15 through a hinge 24, so that the base 15 can be pivoted about the hinge pin 24a into a rest position, in the arrow direction Z, when the fingers 16, 16a or respectively their protrusions 13, 14 are released by the flange part 6.

In its working position, the power take-off shaft 2, which is provided with frontal gear teeth 54 engages the corresponding gear teeth 55 of the transmission shaft 56. Here, through the transmission of the stirrer arm 17 which is not shown in more detail, the tool shaft 57 and the drive shaft 58 are coupled with the power take-off shaft 2 and are moved by the latter.

Figure 2:
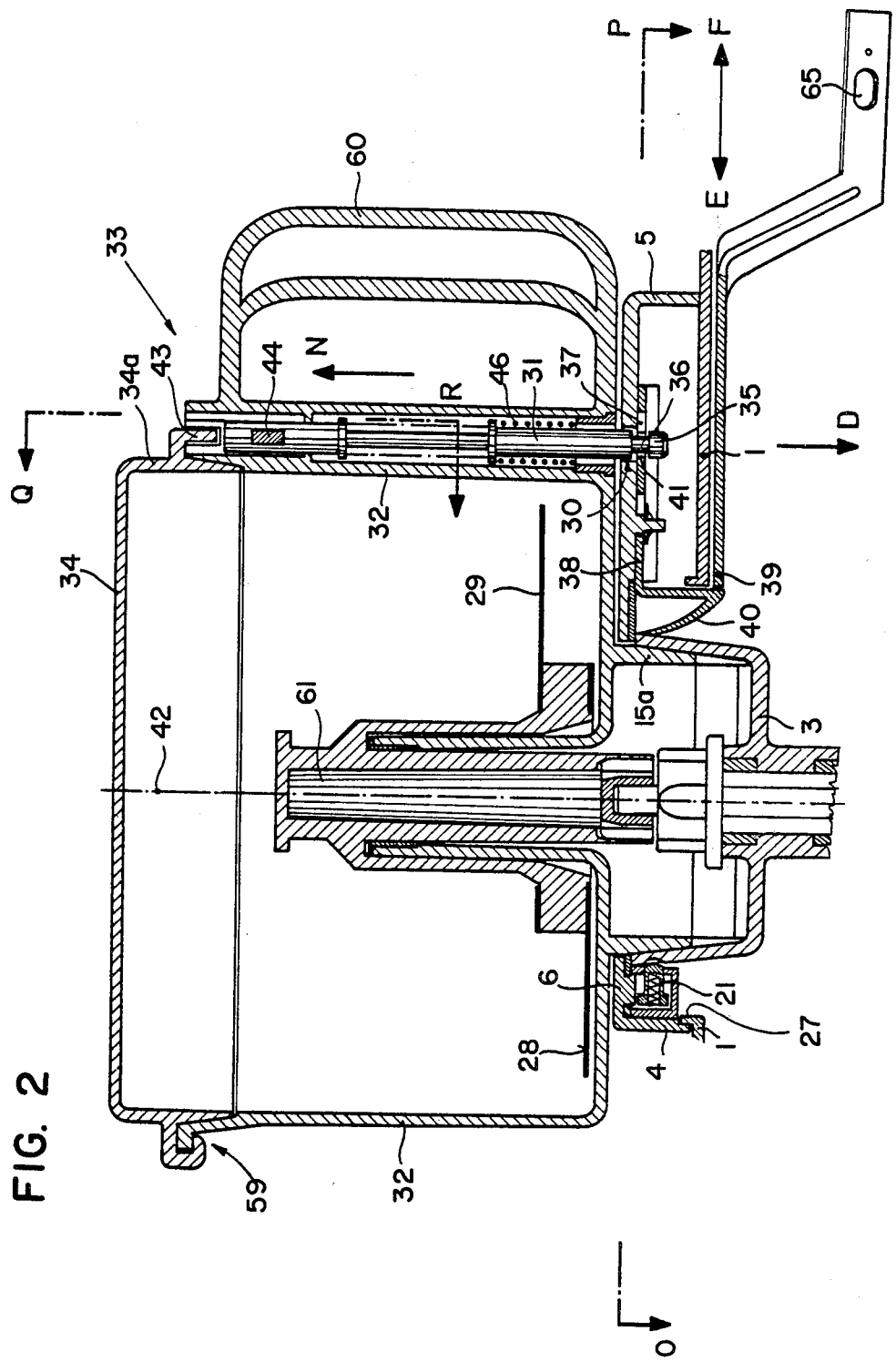
FIG. 2 shows a longitudinal section through an attachment, coupled with the motor base, with its container and container cover in the locked position.
Figure 3:
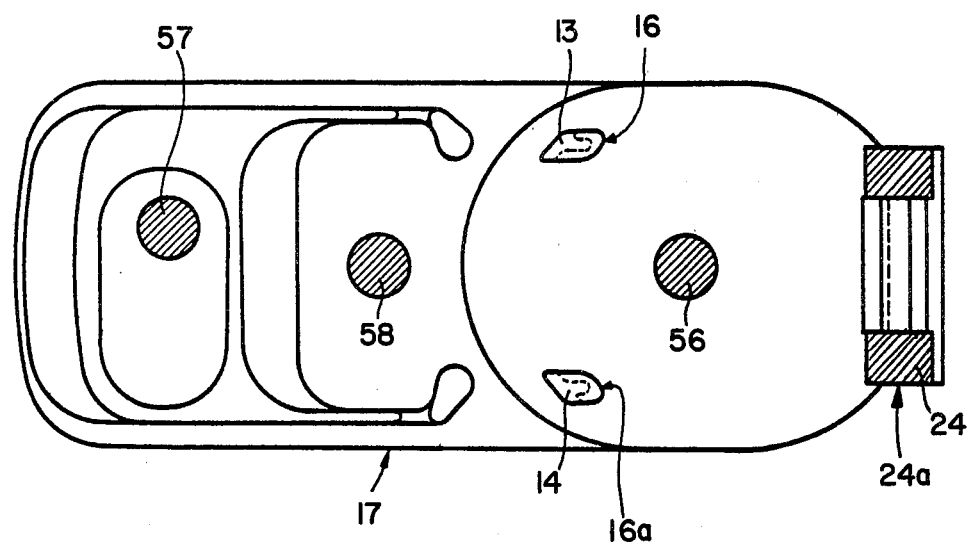
FIG. 3 shows the underside of the stirrer arm with the two fingers and with the protrusions for locking the stirrer arm in its working position (with the base removed).

FIG. 2 shows the container attachment 33 with chopper blades 28, 29, which rotate in a container 32, with a cover 34 that is connected with the container 32 through a bayonet 59, with a handle section 60, a base 15a, and a blade shaft 61.

Figure 7:
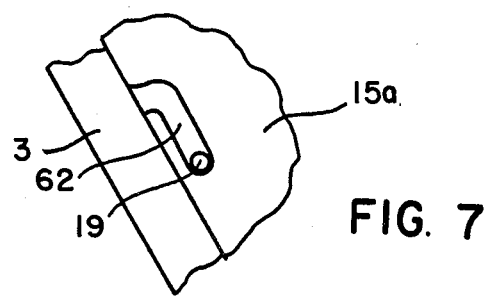
FIG. 7 shows a partial view in the arrow direction U according to FIG. 4, of the base of the attachment unit.

Before inserting the base 32 into the retainer ring 3, the cover 34 is turned about the axis 42 in the sense of closing it, whereby a solid, interlocking connection is established with the container 32 by means of the bayonet 59. At the same time, the locking finger 44 located at the edge 34a of cover 34 and provided with an inclined surface 43 (see FIG. 5) engages the opening 45 of the locking pin 31 and arrests the pin 31 in the position shown in FIG. 2. The container 32, which is inserted into the retaining ring 3 through opening 48 (FIG. 6), can now be pivoted together with the tension ring 4, since the locking pin 31 penetrates through the opening 37, 41, and the pins 18, 19, 20 (FIG. 4), thereby enter the locking slots 62, 63, 64 in the base 15a (FIG. 7).

When the container 32, together with the tension ring 4, has been pivoted so far that the three pins 18, 19, 20 have taken up their terminal positions in the respective locking slots 62, 63, 64, the motor (not shown in detail) can be switched on. A peg disposed at the switching button of the electrical motor switch, engages the opening 65, and, during the switch-on process, moves the blocking rod 39 in the arrow direction E, and thereby carries the slide 38 against the force of the spring 40. Thus the groove 36 of the locking pin 31 enters the slot 37 and thus locks the locking pin 31 at the activation arm 5 of the tension ring 4. The head part 35, in this position, prevents the locking pin 31 from moving in the arrow direction N and thus, due to the action of claw 47 (see FIG. 5), prevents the cover 34 from being opened while the machine is activated. Only when the blocking rod 39 has been moved back in the arrow direction F, i.e. when the motor is switched off, can the container 32 be removed from the motor base 1 and can the cover 34 be opened again, since only in the position of the slide 38 or in the position of the blocking rod 39, which are shown in FIG. 2, can the locking pin 31 move with its head part 35 from the opening 41 in the arrow direction N (moved by the force of the spring 46).

Figure 4:
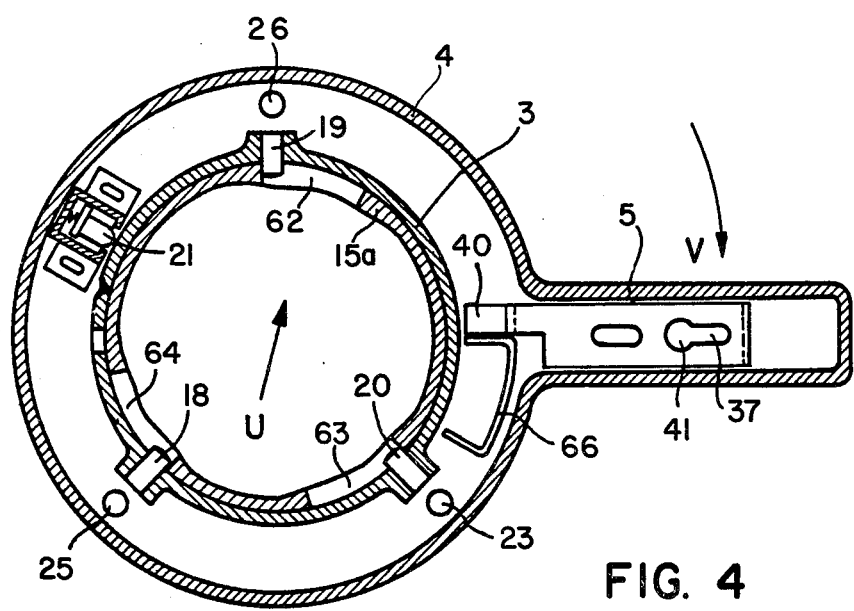
FIG. 4 shows a section through the retainer ring with the tension ring and base for retaining the container of the attachment according to the lines O-P in FIG. 2.
Figure 5:
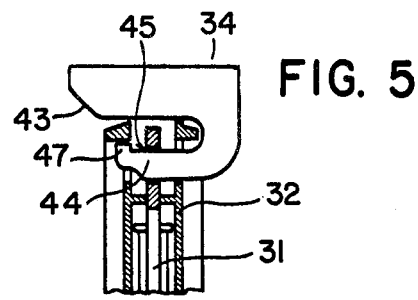
FIG. 5 shows a partial section through the gripping part of the container of the attachment in FIG. 2, according to lines Q-R.

As FIGS. 2 and 4 show, a detent protrusion 21 is provided at the tension ring 4 or at the flange part 6, and is acted upon by a spring. In the locked position M (see FIG. 6), the detent protrusion engages a recess in the retainer ring, and thus secures the tension ring 4 against unintended pivoting. A stop that is rigidly fixed to the motor base 1 is designated by 66, and this stop prevents the tension ring 4 with the activation arm 5 from turning too far in the arrow direction V (FIG. 4), i.e. in the sense of making a lock.

While the invention has herein been illustrated by way of a detailed embodiment, it will be appreciated that various substitutions of equivalents may be made without departing from the spirit and scope of the invention as set forth in the following claims.

We claim:
1. A kitchen appliance, comprising:
   a motor base;
   a power takeoff shaft extending outwardly from said motor base;
   a retainer ring surrounding said power takeoff shaft and rigidly secured to said motor base, said retainer ring having a plurality of radially and inwardly extending pins;
   a tension ring having a circular flange portion with a plurality of recesses and a radially and outwardly extending activation arm;
   a clamping ring;
   means for interconnecting said tension and clamping rings to thereby form a tension ring assembly, wherein said retainer ring is clamped between said tension and clamping rings such that said tension ring assembly is rotatable about said power shaft but is substantially nondisplaceable in the longitudinal direction of said power shaft;
   a tool attachment having a base with radially outward extending protrusions for extending through said tension ring recesses to secure said tool attachment to said tension ring assembly; and
   a container attachment having a base with a plurality of recesses for receiving said pins to secure said container attachment to said retainer ring.

2. The kitchen appliance of claim 1, further comprising a tool attachment housing, hinge means for pivotally connecting said tool attachment housing to said tool attachment base about an axis of rotation perpendicular to said power takeoff shaft, and means for rotating said tension ring assembly when said tool attachment is in a working position such that said radially outward extending projections grip an opposing surface of said flange portion to thereby maintain said tool attachment in said working position.

3. The kitchen appliance of claim 2, wherein said tension ring recesses extend radially outward and one of said protrusions on said tool attachment base includes a groove for engaging two opposing surfaces of said flange portion upon rotation of said tension ring assembly.

4. The kitchen appliance of claim 1, wherein said motor base has an annular collar and said tension ring assembly comprises means for clamping said annular collar between said tension and clamping rings.

5. The kitchen appliance of claim 1, wherein said activation arm includes an opening and further comprising:
   a cover for said container attachment, and;
   locking bolt means, movably mounted on said container attachment and opposed to said opening, for engaging and maintaining said cover in a locked position.

6. The kitchen appliance of claim 5, wherein said locking bolt means has a head part having a groove and further comprising:
   a driving motor;
   a switch for selectively actuating said driving motor;
   a blocking rod coupled to said switch; and
   a slide movably mounted with respect to said activation arm and having a keyhole-shaped slot for receiving said groove to thereby establish an interlock between said locking bolt means and said switch.

7. The kitchen appliance of claim 6, further comprising biasing means for biasing said slide towards an unlocked position wherein said locking bolt means is released from said keyhole-shaped slot, and wherein said blocking rod is coupled to said switch and includes means for displacing said slide against a force exerted by said biasing means towards a locked position wherein said locking bolt means enters and is restrained by said keyhole-shaped slot.

8. The kitchen appliance of claim 7, wherein said locking bolt means has an opening and further comprising:
   means for rotatably supporting and guiding said cover about an axis of said container attachment;
   a spring for biasing said locking bolt means towards said unlocked position;
   an inclined surface formed at a peripheral portion of said cover for displacing said locking bolt means towards said locked position against the force exerted by said spring; and a locking finger on said cover for engaging said opening in said locking bolt means;

whereby, in said locked position, said locking finger engages the opening in said locking bolt means and said head part projects through said keyhole-shaped slot in said slide and said opening in said activation arm.

9. The kitchen appliance of claim 8, wherein said locking finger has a claw for preventing the rotation of said cover about said container attachment axis, after said locking finger has engaged said opening in said locking bolt means.

10. A kitchen appliance, comprising:
- a motor base having a driving motor powering an outwardly extending power shaft;
- a container attachment with a removable cover;
- means for selectively coupling said container attachment to said motor base and said power takeoff shaft;
- a locking bolt movably mounted on said container attachment;
- a slidable member disposed adjacent said locking bolt;
- a switch for selectively activating said driving motor;
- means for linking said slidable member to said switch to thereby cause reciprocation of said member upon actuation of said switch; and
- locking bolt displacement means for displacing said locking bolt upon attachment of said cover to thereby cause engagement of said locking bolt with said slidable member;

whereby uncoupling of said container attachment from said motor base and power takeoff shaft is prevented when said driving motor is in an activated state.

11. The kitchen appliance of claim 10, wherein said locking bolt comprises an elongated member with a head portion having a groove, said slidable member has a keyhole-shaped slot for engaging said groove and maintaining said locking bolt in a locked position, and said locking bolt displacement means comprises an inclined surface formed at a peripheral portion of said cover.

12. The kitchen appliance of claim 11, wherein said locking bolt has an opening and said cover includes a locking finger for engaging said opening.

13. The kitchen appliance of claim 12, wherein said locking finger has a claw for preventing the removal of said cover when said locking bolt is in said locked position.

* * * * *